(12) United States Patent
Li et al.

(10) Patent No.: US 11,865,595 B2
(45) Date of Patent: Jan. 9, 2024

(54) DEVICE FOR WHOLLY TREATING URBAN AND RURAL MIXED HOUSEHOLD REFUSE AT LOW TEMPERATURE ON SITE AND USING METHOD THEREOF

(71) Applicants: Nankai University, Tianjin (CN);
Chifeng Environmental Science Research Institute, Chifeng (CN);
Tianjin Shangyusheng Technology Development Co., Ltd., Tianjin (CN)

(72) Inventors: Weizun Li, Tianjin (CN); Peng Ji, Tianjin (CN); Tianliang Xia, Tianjin (CN); Yuandong Xia, Tianjin (CN); Ruifeng Zhang, Tianjin (CN); Xunwei Wang, Tianjin (CN); Mingyan Yu, Tianjin (CN)

(73) Assignees: Nankai University, Tianjin (CN);
Chifeng Environmental Science Research Institute, Chifeng (CN);
Tianjin Shangyusheng Technology Dev., Co., Ltd., Tianjin (CN)

( * ) Notice: Subject to any disclaimer, the term of this patent is extended or adjusted under 35 U.S.C. 154(b) by 219 days.

(21) Appl. No.: 17/410,494

(22) Filed: Aug. 24, 2021

(65) Prior Publication Data
US 2022/0126336 A1    Apr. 28, 2022

(30) Foreign Application Priority Data
Oct. 28, 2020   (CN) ........................ 202011174351.6

(51) Int. Cl.
*B09B 3/40* (2022.01)
*B09B 3/20* (2022.01)
(Continued)

(52) U.S. Cl.
CPC ................. *B09B 3/40* (2022.01); *B03B 9/06* (2013.01); *B03C 1/22* (2013.01); *B09B 3/20* (2022.01)

(58) Field of Classification Search
CPC .. B03C 1/035; B03C 1/22; B03C 1/30; B02C 23/08; B02C 2201/06; B09B 3/20;
(Continued)

(56) References Cited

U.S. PATENT DOCUMENTS 4,145,007 A * 3/1979 Jetzer ...................... B03B 9/061
241/DIG. 38
5,184,780 A * 2/1993 Wiens ...................... C05F 9/02
241/DIG. 38
(Continued)

*Primary Examiner* — Joseph C Rodriguez
(74) *Attorney, Agent, or Firm* — The Watson IP Group, PLC; Jovan N. Jovanovic

(57) ABSTRACT

A device for wholly treating urban and rural mixed household refuse at low temperature on site is provided. The device includes a vibration sieving and crushing system, a magnetic separator, conveyor belts, a magnetic pulse mineralization reactor and a tail gas purifying device. By using the device, urban and rural mixed household refuse is continuously fed; the mixed household refuse is sieved by the vibrating sieve according to viscosity, weight and size; nonferrous metal is sieved through a magnetic field; and organic substances are conveyed to the magnetic pulse mineralization mixed household refuse treatment device for terminal treatment. So, efficient reduction and harmlessness of the organic substances in the mixed household refuse are realized, and the pollution of organic wastes on the environment is effectively eliminated.

4 Claims, 1 Drawing Sheet

(51) Int. Cl.
    *B03B 9/06*         (2006.01)
    *B03C 1/22*         (2006.01)

(58) Field of Classification Search
    CPC ......... B09B 3/35; B09B 3/40; B09B 2101/25; B09B 2101/85; B03B 9/06; B07B 1/28
    See application file for complete search history.

(56) References Cited

U.S. PATENT DOCUMENTS

| | | | | |
|---|---|---|---|---|
| 5,370,234 | A * | 12/1994 | Sommer, Jr. | B03C 1/12 |
| | | | | 209/636 |
| 8,133,716 | B2 * | 3/2012 | Shin | C05F 17/50 |
| | | | | 241/26 |
| 8,459,466 | B2 * | 6/2013 | Duffy | B03B 11/00 |
| | | | | 209/592 |
| 10,835,927 | B2 * | 11/2020 | Torriere | B03C 1/30 |
| 2006/0085212 | A1 * | 4/2006 | Kenny | B03B 9/06 |
| | | | | 705/308 |
| 2011/0121112 | A1 * | 5/2011 | Alford | B09B 3/40 |
| | | | | 241/24.1 |
| 2014/0069798 | A1 * | 3/2014 | Hayward | C10B 57/06 |
| | | | | 44/605 |
| 2018/0229273 | A1 * | 8/2018 | Carvajo Lucena | C10L 5/445 |
| 2019/0176163 | A1 * | 6/2019 | Valerio | B03C 1/025 |
| 2021/0188541 | A1 * | 6/2021 | Kurani | B65F 1/14 |
| 2023/0120932 | A1 * | 4/2023 | Parr | B07C 5/36 |
| | | | | 209/577 |

* cited by examiner

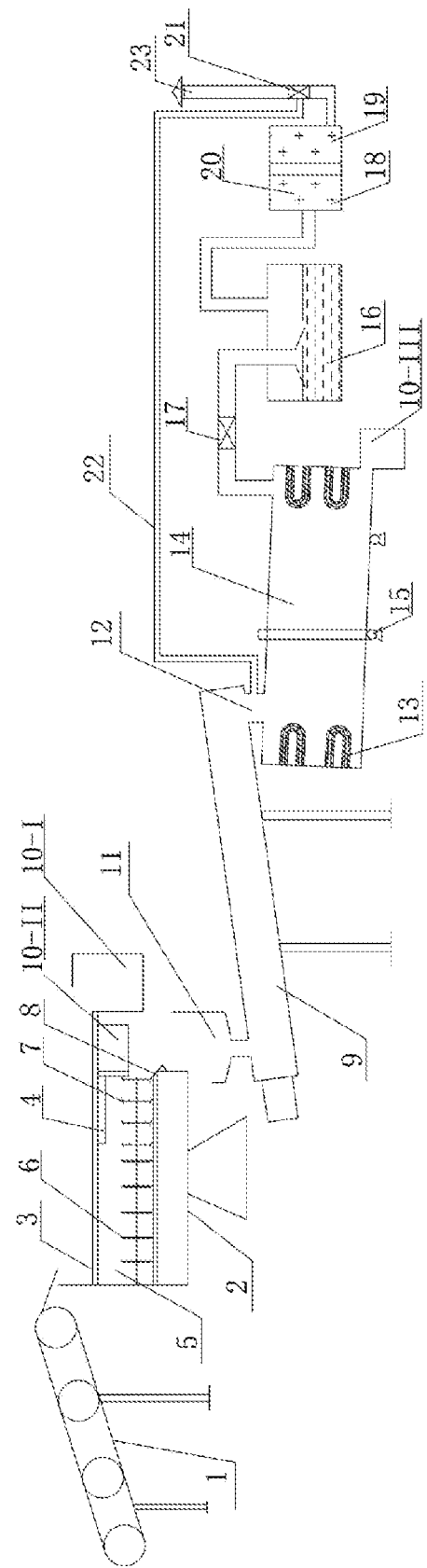

DEVICE FOR WHOLLY TREATING URBAN AND RURAL MIXED HOUSEHOLD REFUSE AT LOW TEMPERATURE ON SITE AND USING METHOD THEREOF

CROSS REFERENCE TO RELATED APPLICATION

This patent application claims the benefit and priority of Chinese Patent Application No. 202011174351.6 filed on Oct. 28, 2020, the disclosure of which is incorporated by reference herein in its entirety as part of the present application.

TECHNICAL FIELD

The present disclosure relates to a method for treating mixed household refuse at low temperature, in particular to a device for wholly treating urban and rural mixed household refuse at low temperature on site and a using method thereof.

BACKGROUND ART

The household refuse means a type of substance which is generated in the human life process and is difficult to utilize. The household refuse mainly includes kitchen refuse, fruit and vegetable refuse, waste paper, packaging boxes, plastic products, wood products, metal products, glass products, dust and the like. Although refuse classification has been carried out in remote villages, villagers have low knowledge level and are difficult to carry out the refuse classification. Furthermore, the refuse transportation distance in these areas is long, so that the cost is higher, and the problems, such as leakage and venting in the transportation process, cause environmental pollution and also cause serious financial burdens.

The existing refuse treatment methods include a landfill method, an incineration method and the like. Land resources are occupied by the landfill. Household refuse is high in water content and low in incineration heat value, so that potential safety hazards in the incineration process are high. The problems are as follows. The household refuse is long in transportation distance, the household refuse is high in treatment cost and the household refuse is serious in pollution, the sieving needs a lot of manpower, etc. In order to solve these above problems, the present disclosure provides a device for wholly treating urban and rural mixed household refuse at low temperature on site and a using method thereof. In the method, the attributive characteristics of the household refuse is utilized, and based on the heating principle of the electromagnetic field for wholly sieving, the generated heat uniformly acts on the mixed household refuse. So, organic substances are converted and decomposed at low-temperature, which has the characteristics of high speed, high efficiency, low temperature, unattended operation and the like, and further achieves the high-efficient harmlessness and the reduction of the household refuse.

SUMMARY

Aiming at the above problems, the present disclosure provides a device for wholly treating urban and rural mixed household refuse at low temperature on site and a using method thereof. Compared with the prior art, the mixed household refuse treatment technique has advantages as follows. The method is simple and easy to operate; the method has unattended operation and no secondary pollution in the degradation process; the occupied area is saved, the treatment efficiency of the device can be effectively improved, the energy consumption is saved, and the treatment cost is reduced.

The technical scheme of the present disclosure is as follows.

A device for wholly treating urban and rural mixed household refuse at low temperature on site, wherein the device includes a vibration sieving and crushing system, a magnetic separator, conveyor belts, a magnetic pulse mineralization reactor and a tail gas purifying device; the device is provided with feeding openings, discharging openings, a tail gas outlet and pipelines; the household refuse is fed into one of the feeding openings that is formed in a front end of the vibration sieving and crushing system through a belt conveyor; the discharging openings includes three discharging openings that are a vibrating-layer lower discharging opening, a magnetic-separator lower discharging opening and a magnetic-pulse-mineralization-processor lower discharging opening respectively; the vibration sieving and crushing system leaves bricks, tiles, glass products included in the household refuse on a vibrating sieve under vibration; organic substances, metal products comprised in the household refuse enter a lower sieving and crushing system through upper sieve pores of the vibrating sieve, crushing cutter heads are arranged at a front part of the sieving and crushing system and are configured for crushing the household refuse; substances in the household refuse after being crushed enter a rear magnetic separation system; the metal products are separated from the household refuse under magnetic force in a spiral conveying process of conveying blades; the household refuse after being sieved enters a spiral feeding machine through a pushing outlet, so that the household refuse is fed into the magnetic pulse mineralization reactor; the magnetic pulse mineralization reactor is a continuous cylindrical reaction device; electromagnetic generators are arranged on two side walls of the magnetic pulse mineralization reactor; a rotating device is arranged at a bottom of the magnetic pulse mineralization reactor; continuous rotation of the magnetic pulse mineralization reactor is achieved through a rolling shaft base, so that the household refuse is continuously pushed towards the magnetic-pulse-mineralization-reactor lower discharging opening during reacting; circulating nitrogen is introduced at a magnetic-pulse-mineralization-reactor feeding opening to enable external air not to enter the magnetic pulse mineralization reactor; tail gas generated by the magnetic pulse mineralization reactor enters the tail gas purifying device; the tail gas purifying device is a sealed box and is positioned on outside the magnetic pulse mineralization reactor; a water absorption device and an ultraviolet purifying device are fixed in the tail gas purifying device; air induction operation is performed at a rear end of the tail gas purifying device through a negative pressure fan; the ultraviolet purifying device includes a far ultraviolet reaction device with a wavelength of 185 nm and an ultraviolet reaction device with a wavelength of 254 nm that are arranged in series; the ultraviolet purifying device is filled with Degussa P25 $TiO_2$ filler; the tail gas after being purified passes through a nitrogen separator to generate high-purity nitrogen; the high-purity nitrogen is fed into an inlet of the magnetic pulse mineralization reactor through a high-purity nitrogen recycling pipeline, and residual gas of the tail gas after being purified is discharged from a tail gas discharge opening; a vibrating-sieve upper discharging opening is configured for continuously discharging the bricks, the tiles, the glass products included in the household refuse; the magnetic-separator lower discharging opening is configured for continuously discharging the metal products in the household refuse to facilitate recycle; and the magnetic-pulse-mineralization-processor lower discharging opening is configured for discharging reacted ash from the magnetic pulse mineralization reactor.

In a using method of the device for wholly treating urban and rural mixed household refuse at low temperature on site, the household refuse is continuously fed; the household refuse in a mixed state is sieved by the vibrating sieve according to viscosity, weight and size of the substances of the household refuse; metal products are sieved through a magnetic field of the magnetic separation system, the organic substances are conveyed to the magnetic pulse mineralization reactor for terminal treatment, and waste gas generated by the system is treated by the tail gas purifying device, so as to enable efficient reduction and harmlessness of the household refuse treated wholly on site, and to effectively eliminate pollution of the organic substances on environment; where the using method includes: step 1), placing the urban and rural mixed household refuse in the vibration sieving and crushing system by a belt conveyor, and sieving the substances with different viscosities, sizes and weights based on characteristics of small amplitude, high frequency and large inclination angle of the vibrating sieve, so that the glass products bricks and tiles are be separated from the household refuse; step 2), enabling the substances sieved by the vibrating sieve to enter the magnetic separation system; magnetically attracting the metal products that are residual in the household refuse by an electromagnet of the magnetic separation system during vibration of the vibration sieve, and separating the metal products from the household refuse, so as to facilitate subsequent recycle; step 3), conveying the household refuse after being sieved into the magnetic pulse mineralization reactor through the spiral feeding machine, where content of the organic products is 90-95%; step 4) controlling conveying amount for the household refuse through an automatic program, and maintaining the conveying amount at 0.04-0.13 t/h; step 5) enabling the household refuse to be in the magnetic pulse mineralization reactor, and maintaining a temperature of the magnetic pulse mineralization reactor at 160-200° C. under continuous action of an electromagnetic field of the magnetic pulse mineralization reactor; step 6) starting the negative pressure fan, a far ultraviolet purifier and an ultraviolet purifier, and directionally controlling tail gas generated in the reaction process, so that the tail gas sequentially passes through the water absorption device, the far ultraviolet purifier and the ultraviolet purifier, and the dust removal and organic pollutant removal are achieved; step 7) separating high-concentration nitrogen after the purified tail gas passes through a nitrogen separation device, reusing the separated high-concentration nitrogen at an inlet of the magnetic pulse mineralization reactor to isolate oxygen, and continuously decomposing the tar component in the reaction gas by utilizing reaction heat; step 8) enabling the retention time of the unit materials in the magnetic pulse mineralization reactor to be 18-28 hours, and continuously discharging reacted ash from the magnetic-pulse-mineralization-reactor discharging opening by virtue of gravity.

The urban and rural mixed household refuse is one or more of kitchen refuse, fruit and vegetable refuse, waste paper, the packaging boxes, the plastic products, the wood products, the metal products, the glass products, and ash.

Clinker ignition loss of the reacted ash is lower than 3%.

The embodiments have the following advantages and beneficial effects.

The device has the advantages of simple, easy operation, simple process, high automation degree, and small occupied area. Furthermore, energy consumption can be effectively reduced through electromagnetic heating, and the amount of organic substances in the mixed household refuse is reduced by more than 95%. The application of the technology can effectively reduce the problem of daily production and daily clearance of remote rural refuse, decrease environmental pollution, and reduces the collection cost, storage cost and transportation cost for refuse that are spent by the government, which has significant benefits to environment, society and economy.

BRIEF DESCRIPTION OF THE DRAWINGS

FIG. 1 is a front schematic structural diagram of a device for wholly treatment.

Reference signs in drawings: 1, belt conveyor; 2, vibration sieving and crushing system; 3, vibrating sieve; 4, magnetic separation system; 5, sieving and crushing system; 6, crushing cutter head; 7, conveying blade; 8, pushing outlet; 9, spiral feeding machine; 10-I, vibrating-layer lower discharging opening;

10-II, magnetic-separator lower discharging opening;

10-III, magnetic-pulse-mineralization-processor lower discharging opening;

11, spiral-feeding-machine feeding opening; 12, magnetic-pulse-mineralization-reactor feeding opening; 13, electromagnetic generator; 14, magnetic pulse mineralization reactor; 15, rolling shaft base; 16, water absorption device; 17, negative pressure fan; 18, far ultraviolet reaction device; 19, ultraviolet reaction device; 20, P25 filler; 21, nitrogen separator; 22, high-purity nitrogen recycling pipeline; 23, tail gas discharge opening.

DETAILED DESCRIPTION OF THE EMBODIMENTS

The present disclosure is further described in detail by the following embodiments in conjunction with the attached FIGURES, but the technical content set forth in the embodiments is illustrative and not restrictive, and the scope of protection of the present disclosure should not be limited in this way.

Embodiment I

A device for wholly treating urban and rural mixed household refuse at low temperature on site is provided. The device includes a vibration sieving and crushing system, a magnetic separator, conveyor belts, a magnetic pulse mineralization reactor and a tail gas purifying device. The device is provided with feeding openings, discharging openings, a tail gas outlet and pipelines. Materials (i.e., the household refuse) are fed into the feeding opening formed in a front end of the vibration sieving and crushing system 2 through a belt conveyor 1. The discharging openings include three discharging openings that are a vibrating-layer lower discharging opening 10-I, a magnetic-separator lower discharging opening 10-II and a magnetic-pulse-mineralization-processor lower discharging opening 10-III respectively. In the vibration sieving and crushing system 2, bricks, tiles, glass products and the like in the household refuse are left on a vibrating sieve 3 under vibration. Organic substances, metal products and the like in the household refuse enter a lower sieving and crushing system 5 through upper sieve pores (i.e., the sieve pores of the vibrating sieve). Crushing cutter heads 6 are arranged at the front part of the sieving and crushing system 5 and are used for crushing the household refuse. The crushed substances (i.e., crushed household refuse) enter a rear magnetic separation system 4. Metal products are separated from the household refuse under the action of magnetic force in a spiral conveying process of conveying blades 7. The sieved household refuse enters a spiral feeding machine 9 through a pushing outlet 8, so that the materials are fed into the magnetic pulse mineralization reactor 14. The magnetic pulse mineralization reactor 14 is a continuous cylindrical reaction device. Electromagnetic generators 13 are arranged on two side walls of the magnetic pulse mineralization reactor 14, and a rotating device is arranged at a bottom of the magnetic pulse mineralization reactor 14. Continuous rotation of the reactor is achieved through a rolling shaft base 15, so that the materials are guaranteed to be continuously pushed towards an outlet (i.e., the magnetic-pulse-mineralization-reactor lower discharging opening) in the rear end in the reaction process. Circulating nitrogen is introduced at a magnetic-pulse-mineralization-reactor feeding opening 12 to guarantee that external air cannot enter the reactor. Tail gas generated by the magnetic pulse mineralization reactor 14 enters the tail gas purifying device. The tail gas purifying device is a sealed box and is positioned outside the magnetic pulse mineralization reactor. A water absorption device 16 and an ultraviolet purifying device are fixed in the tail gas purifying device. Air induction operation is performed at a rear end of the tail gas purifying device through a negative pressure fan 17. The ultraviolet purifying device includes a far ultraviolet reaction device 18 with the wavelength of 185 nm and an ultraviolet reaction device 19 with the wavelength of 254 nm that are arranged in series. The ultraviolet purifying device is filled with Degussa P25 $TiO_2$ filler 20. The purified tail gas passes through a nitrogen separator 21 to generate high-purity nitrogen, and the high-purity nitrogen is fed into an inlet of the magnetic pulse mineralization reactor through a high-purity nitrogen recycling pipeline 22. Residual gas of the tail gas is discharged from a tail gas discharge opening 23. The vibrating-sieve upper discharging opening (i.e., vibrating-layer lower discharging opening) 10-I is used for continuously discharging bricks, tiles, glass products and the like in the mixed household refuse. The magnetic-separator lower discharging opening 10-II is used for continuously discharging metal substances in the mixed household refuse, so as to facilitate the recycle. The magnetic-pulse-mineralization-processor lower discharging opening 10-III is used for discharging reacted ash from the system (i.e., the magnetic pulse mineralization reactor).

In the embodiment, the vibration sieving and crushing system, the conveyor belts, the magnetic pulse mineralization reactor and the tail gas purifying device are all produced by Tianjin Shangyusheng Technology Development Co., Ltd. The negative pressure fan is a product with Model 1380 produced by Dongguan Changping Minxin electromechanical Co., Ltd.; and a motor used in a transmission device is a product with Model JXJE74 produced by Zhejiang Yongjia Governor Factory.

The following embodiments are a using method of the device for wholly treating urban and rural mixed household refuse at low temperature on site.

Embodiment II

A using method of the device for wholly treating urban and rural mixed household refuse at low temperature on site is provided. Urban and rural mixed household refuse is continuously fed. The mixed household refuse is sieved by using the vibrating sieve according to viscosity, weight and size of the substances of the household refuse. Then, nonferrous metal (i.e., metal product) is sieved through a magnetic field (i.e., the magnetic field of the magnetic separation system), organic substances are conveyed to the magnetic pulse mineralization reactor for terminal treatment. Waste gas (i.e., trail gas) generated by the system (i.e., the magnetic pulse mineralization reactor) is treated through the tail gas purifying device, so as to realize the high-efficient reduction and harmlessness of the mixed household refuse that is wholly treated on site, which effectively eliminate the pollution of organic wastes (i.e., organic substance) in the household refuse on the environment. The using method includes the following step 1) to step 8).

In step 1), the urban and rural mixed household refuse (kitchen refuse, fruit and vegetable refuse, plastic products, wood products, metal products, glass products and dust) are placed in the vibration sieving and crushing system by utilizing a belt conveyor, and the substance is sieved according to viscosity, size and weight by utilizing the characteristics of small amplitude, high frequency and large inclination angle of the vibrating sieve, so that glass products, bricks and tiles are separated from refuse.

In step 2), the substances sieved by the vibrating sieve are enabled to enter the magnetic separation system, residual nonferrous metals in the household refuse are magnetically attracted by using electromagnetism, and the nonferrous metals are separated from the household refuse, so as to facilitate subsequent recycle;

In step 3), sieved household refuse is conveyed into the magnetic pulse mineralization reactor through a spiral conveyer, wherein the content of the organic refuse (i.e., organic substance) is 93%;

In step 4), refuse conveying amount is controlled through an automatic program, and the conveying amount is maintained at 0.1 t/h.

In step 5), the household refuse is enabled in the magnetic pulse mineralization reactor, the temperature (e.g., inner temperature) of the system (i.e., the magnetic pulse mineralization reactor) is maintained at 190° C. under continuous action of an electromagnetic field of the magnetic pulse mineralization reactor.

In step 6), the negative pressure fan, a far ultraviolet purifier and an ultraviolet purifier are started, and tail gas generated in the reaction process (i.e., reaction occurs in the magnetic pulse mineralization reactor) is directionally controlled, so that the tail gas sequentially passes through the water absorption device, the far ultraviolet purifier and the ultraviolet purifier, and the dust removal and organic pollutant removal are achieved;

In step 7), high-concentration nitrogen is separated after the purified tail gas passes through a nitrogen separation device, the separated high-concentration nitrogen is reused at an inlet of the reactor (i.e., the magnetic pulse mineralization reactor) to isolate oxygen, and the tar component in the reaction gas of the magnetic pulse mineralization reactor is continuously decomposed by utilizing reaction heat.

In step 8), the retention time of the materials in the system (i.e., the magnetic pulse mineralization reactor) is enabled to be 22 hours, and reacted ash is continuously discharged from the bottom (i.e., lower discharging opening) of the reactor by virtue of gravity, wherein the clinker ignition loss of the ash is 2.7%.

The present disclosure has the following advantages and beneficial effects.

By means of the technology, reduction and harmlessness of rural mixed household refuse can be rapidly achieved, the reduction of organic refuse exceeds 95%, the operation cost is low, the occupied area is small, the collection cost, storage cost and transportation cost for refuse that are spent by the government are reduced, and discharge of toxic and harmful substances such as dioxin is avoided.

Embodiment III

A using method of the device for wholly treating urban and rural mixed household refuse at low temperature on site is provided. Urban and rural mixed household refuse is continuously fed. The mixed household refuse is sieved by using the vibrating sieve according to viscosity, weight and size. Then, nonferrous metal is sieved through a magnetic field of the magnetic separation system, and organic substances are conveyed to the magnetic pulse mineralization reactor for terminal treatment. Waste gas generated by the system is treated through the tail gas purifying device, so that efficient reduction and harmlessness of the mixed household refuse that are treated wholly on site are realized, so as to effectively eliminate the pollution of organic wastes in the household refuse on the environment. The using method includes the following step 1) to step 8).

In step 1), the urban and rural mixed household refuse (kitchen refuse, fruit and vegetable refuse, plastic products, wood products, metal products, glass products and ash) are placed in the vibration sieving and crushing system by utilizing a belt conveyor, and the substances are sieved according to viscosity, size and weight by utilizing the characteristics of small amplitude, high frequency and large inclination angle of the vibrating sieve, so that glass products, bricks and tiles can be separated from refuse.

In step 2), the substances sieved by the vibrating sieve are enabled to enter the magnetic separation system, residual nonferrous metals in the household refuse are magnetically attracted by using electromagnetism, and the nonferrous metals are separated from the household refuse, so as to facilitate subsequent recycle.

In step 3), sieved household refuse is conveyed into the magnetic pulse mineralization reactor through a spiral conveyer, wherein the content of the organic refuse is 93%.

In step 4), the refuse conveying amount is controlled through an automatic program, and the conveying amount is maintained at 0.13 t/h.

In step 5), the household refuse is enabled in the magnetic pulse mineralization reactor, the temperature of the system is maintained at 200° C. under the continuous action of an electromagnetic field of the magnetic pulse mineralization reactor.

In step 6), the negative pressure fan, a far ultraviolet purifier and an ultraviolet purifier are started, and tail gas generated in the reaction process is directionally controlled, so that the tail gas sequentially passes through the water absorption device, the far ultraviolet purifier and the ultraviolet purifier, and the dust removal and organic pollutant removal are achieved.

In step 7), high-concentration nitrogen is separated after the purified tail gas passes through a nitrogen separation device, the separated high-concentration nitrogen is reused at an inlet of the reactor to isolate oxygen, and the tar component in the reaction gas of the magnetic pulse mineralization reactor is continuously decomposed by utilizing reaction heat.

In step 8), the retention time of the materials in the system is enabled to be 24 hours, and reacted ash is continuously discharged from the bottom of the reactor by virtue of gravity, wherein the clinker ignition loss of ash is 2.8%.

The urban and rural mixed household refuse is one or more types.

By means of the technology, reduction and harmlessness of rural mixed household refuse can be rapidly achieved, the reduction of organic refuse exceeds 95%, the operation cost is low, the occupied area is small, the collection cost, storage cost and transportation cost for refuse that are spent by the government are reduced, and discharge of toxic and harmful substances such as dioxin is avoided.

What is claimed is:

1. A device for wholly treating urban and rural mixed household refuse at low temperature on site, the device comprising a vibration sieving and crushing system, a magnetic separator, conveyor belts, a magnetic pulse mineralization reactor and a tail gas purifying device;
   wherein the device for wholly treating urban and rural mixed household refuse at low temperature on site further comprises:
   feeding openings, wherein the household refuse is fed into one of the feeding openings that is formed in a front end of the vibration sieving and crushing system through a belt conveyor comprised in the device for wholly treating urban and rural mixed household refuse at low temperature on site;
   discharging openings comprise:
     a vibrating-layer lower discharging opening;
     a magnetic-separator lower discharging opening; and
     a magnetic-pulse-mineralization-processor lower discharging opening;
   a tail gas outlet;
   pipelines;
   electromagnetic generators arranged on two side walls of the magnetic pulse mineralization reactor;
   a rotating device arranged at a bottom of the magnetic pulse mineralization reactor; and
   a water absorption device and an ultraviolet purifying device which are fixed in the tail gas purifying device, wherein the ultraviolet purifying device is filled with Degussa P25 $TiO_2$ filler and comprises:
     a far ultraviolet reaction device with a wavelength of 185 nm; and
     an ultraviolet reaction device with a wavelength of 254 nm that are arranged in series;
   wherein the vibration sieving and crushing system leaves bricks, tiles, and glass products comprised in the household refuse on a vibrating sieve under vibration;
   organic substances, and metal products comprised in the household refuse enter a lower sieving and crushing system comprised in the device for wholly treating urban and rural mixed household refuse at low temperature on site through sieve pores of the vibrating sieve, crushing cutter heads are arranged at a front part of the sieving and crushing system and are configured for crushing the household refuse;
   substances in the household refuse after being crushed enter a rear magnetic separation system comprised in the device for wholly treating urban and rural mixed household refuse at low temperature on site;
   the metal products are separated from the household refuse under magnetic force in a spiral conveying process of conveying blades comprised in the device for wholly treating urban and rural mixed household refuse at low temperature on site;
   the household refuse after being sieved enters a spiral feeding machine comprised in the device for wholly treating urban and rural mixed household refuse at low temperature on site through a pushing outlet, so that the household refuse is fed into the magnetic pulse mineralization reactor;

the magnetic pulse mineralization reactor is a continuous cylindrical reaction device;

continuous rotation of the magnetic pulse mineralization reactor is achieved through a rolling shaft base comprised in the device for wholly treating urban and rural mixed household refuse at low temperature on site, so that the household refuse is continuously pushed towards the magnetic-pulse-mineralization-reactor lower discharging opening during reacting;

circulating nitrogen is introduced at a magnetic-pulse-mineralization-reactor feeding opening to enable external air not to enter the magnetic pulse mineralization reactor;

tail gas generated by the magnetic pulse mineralization reactor enters the tail gas purifying device;

the tail gas purifying device is a sealed box and is positioned on outside the magnetic pulse mineralization reactor;

air induction operation is performed at a rear end of the tail gas purifying device through a negative pressure fan comprised in the device for wholly treating urban and rural mixed household refuse at low temperature on site;

the tail gas after being purified passes through a nitrogen separator comprised in the device for wholly treating urban and rural mixed household refuse at low temperature on site to generate high-purity nitrogen;

the high-purity nitrogen is fed into an inlet of the magnetic pulse mineralization reactor through a high-purity nitrogen recycling pipeline, and residual gas of the tail gas after being purified is discharged from a tail gas discharge opening;

the vibrating-layer lower discharging opening is configured for continuously discharging the bricks, the tiles, and the glass products comprised in the household refuse;

the magnetic-separator lower discharging opening is configured for continuously discharging the metal products in the household refuse to facilitate recycle; and the magnetic-pulse-mineralization-processor lower discharging opening is configured for discharging reacted ash from the magnetic pulse mineralization reactor.

2. A using method of the device for wholly treating urban and rural mixed household refuse at low temperature on site according to claim 1, wherein the household refuse is continuously fed; the household refuse in a mixed state is sieved by the vibrating sieve according to viscosity, weight and size of the substances of the household refuse; metal products are sieved through a magnetic field of the magnetic separation system, and the organic substances are conveyed to the magnetic pulse mineralization reactor for terminal treatment, so as to enable efficient reduction and harmlessness of the organic substances in the household refuse, and to effectively eliminate pollution of the organic substances on environment; wherein the using method comprises:

step 1), placing the household refuse in the vibrating sieve, and sieving the substances with different viscosities, sizes and weights based on characteristics of small amplitude, high frequency and large inclination angle of the vibrating sieve, so that the metal products, the glass products and partial waste paper, packaging boxes, plastic products, wood products and dust are be separated from the household refuse;

step 2), magnetically attracting the metal products that are residual in the household refuse by an electromagnet of the magnetic separation system during vibration of the vibration sieve, and separating the metal products from the household refuse, so as to facilitate subsequent recycle;

step 3), conveying the organic products after being sieved into the magnetic pulse mineralization reactor through the spiral feeding machine, wherein content of the organic products is 90-95%;

step 4), controlling conveying amount for the household refuse through an automatic program, and maintaining the conveying amount at 0.04-0.13 t/h;

step 5), enabling the organic products to be in the magnetic pulse mineralization reactor, and maintaining a temperature of the magnetic pulse mineralization reactor at 160-200° C. under continuous action of an electromagnetic field of the magnetic pulse mineralization reactor;

step 6), circularly introducing tail gas generated in the magnetic pulse mineralization reactor into the magnetic pulse mineralization reactor after being catalyzed by plasma and ultraviolet light, removing gaseous pollutants by utilizing the plasma and the ultraviolet light, and continuously decomposing tar components in reaction gas of the magnetic pulse mineralization reactor by utilizing reaction heat; and step 7), enabling retention time of the household refuse in the magnetic pulse mineralization reactor to be 18-28 hours, and continuously discharging the reacted ash from the magnetic-pulse-mineralization-reactor lower discharging opening by virtue of gravity.

3. The using method of the device for wholly treating urban and rural mixed household refuse at low temperature on site according to claim 2, wherein the household refuse is one or more of kitchen refuse, fruit and vegetable refuse, waste paper, the packaging boxes, the plastic products, the wood products, the metal products, the glass products, and the dust.

4. The using method of the device for wholly treating urban and rural mixed household refuse at low temperature on site according to claim 2, wherein clinker ignition loss of the reacted ash is lower than 3%.

* * * * *